June 17, 1924.
B. F. HALVORSEN
1,498,030
APPARATUS FOR THE PRODUCTION OF CONCENTRATED NITROUS GASES
Filed June 29, 1920
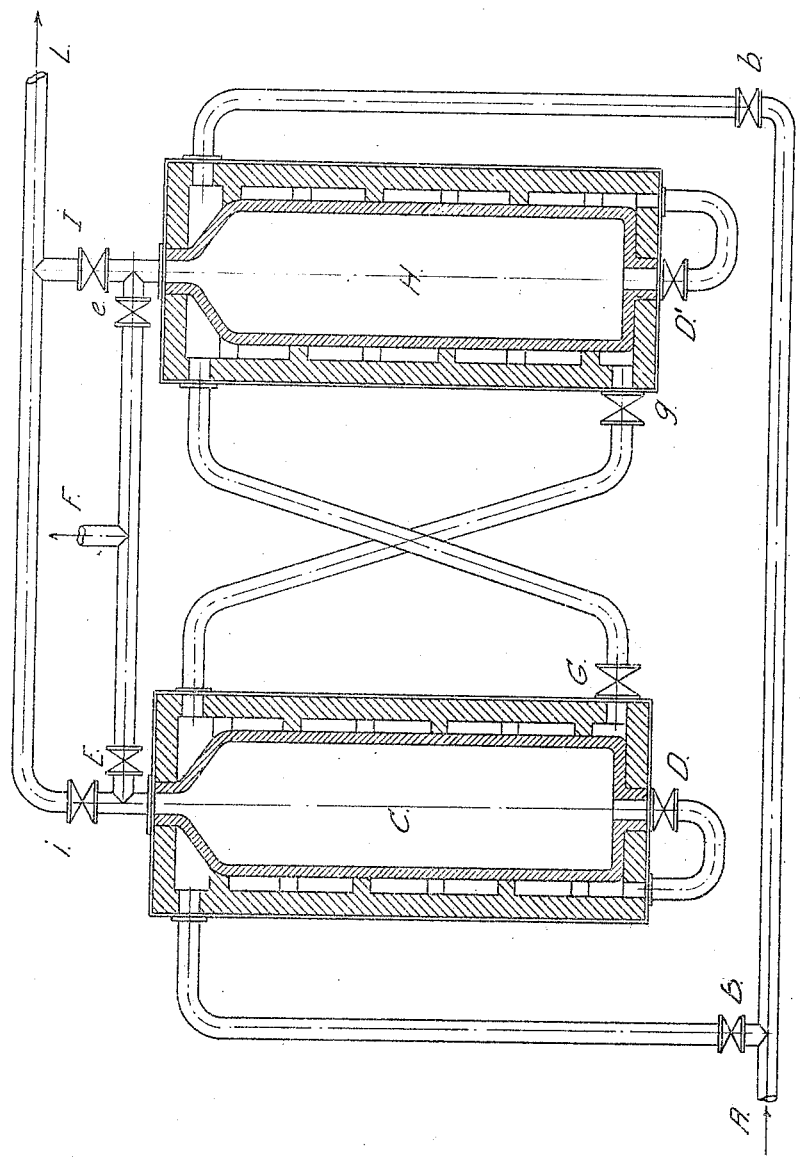

Patented June 17, 1924.

1,498,030

UNITED STATES PATENT OFFICE.

BIRGER FJELD HALVORSEN, OF CHRISTIANIA, NORWAY, ASSIGNOR TO NORSK HYDRO-ELEKTRISK KVAELSTOFAKTIESELSKAB, OF CHRISTIANIA, NORWAY,

APPARATUS FOR THE PRODUCTION OF CONCENTRATED NITROUS GASES.

Application filed June 29, 1920. Serial No. 392,731.

*To all whom it may concern:*

Be it known that I, BIRGER FJELD HALVORSEN, a subject of the King of Norway, residing at Christiania, Norway, have invented certain new and useful Improvements in Apparatus for the Production of Concentrated Nitrous Gases; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the treatment of dilute nitrous gases to effect the concentration of the same.

In the U. S. A. patent specification No. 1,316,950, dated September 23, 1919, a process of concentrating dilute nitrous gases is described which consists in absorbing the dilute nitrous gases in dry bases and subsequently expelling nitrous gases and nitric acid from the saturated absorption agent.

According to the present invention an improved result is obtained by carrying the absorption and decomposition into effect in an apparatus comprising refactory and acid proof vessels enclosed in gastight jackets which are able to resist a comparatively high pressure in combination with means to maintain a pressure inside of the said jacket. By the use of an apparatus of this construction the absorbent is placed in the inner vessel which may be in the form of a retort. The jacket surrounding the inner retort may be constructed of iron or aluminium so as to be gastight and able to resist pressure. The jacket may be provided with a lining of firebrick as an insulation. In a space between the jacket and the inner vessel through which hot nitrous gases may be passed horizontal plates or baffles are suitably arranged to convey the hot nitrous gases in such a manner, that a suitable heat transmission is attained.

The apparatus is suitably employed in the manner that hot nitrous gases are first caused to pass outside of an inner retort containing the absorbent in a saturated condition with nitrous gases, (viz, saturated with nitrous gases) whereupon the gases are conveyed through fresh or regenerated absorption agent. Before the nitrous gases are passed through the fresh or regenerated absorption agent they may be caused to pass around the vessel containing the absorption agent.

The expulsion of nitrous gases and nitric acid from the saturated absorption agent can be facilitated by means of a flow of vapour or gas through the material.

If a flow of gas is chosen one may suitably employ the hot nitrous gases. The gases can then be withdrawn from the main gas conduit or from the jacket enclosing the retort.

Instead of single retorts one may use aggregates or batteries of retorts, which may be coupled in series or in parallel or both systems in combination may be used. It may be suitable to couple the absorption retorts in series and to, operate according to the counter current principle in that retorts with fresh absorption material are successively coupled in after the other ones, so that the retort which contains saturated absorption material is placed for the expulsion of the concentrated nitrous gases, while the next retort containing nearly saturated absorption material is used as the first absorption retort, and so on.

It has been found to be of advantage in the operation of an apparatus of the described character to cause the absorption to take place at elevated temperature (300–600° C.). This is of special advantage when at the same time the pressure in the absorption vessels is increased. An increased pressure will be of advantage, however, also when low temperatures are employed.

It has also been found that the nitrous gases and the nitric acid is more readily expelled from the absorption agent, when the expulsion is effected at a pressure below the absorption pressure and it may be in conjunction with blowing steam or gas through the material.

A plant arranged in accordance with the invention is described in the following by way of example reference being had to the accompanying drawing, which shows a sectional view of the plant.

In the illustrated example furnace gas is passed through the pipe A and the valve B into the outer jacket surrounding the retort C, which latter contains absorption material saturated with nitrogen oxides. A small portion of the gas is passed through the valve D into the retort C where it takes up nitrous gases and nitric acid from the heated absorption material and escapes through the valve E and pipe F. The principal quantity of the gas from the jacket enclosing the retort C passes through the valve G into the jacket surrounding the retort H and therefrom through the valve D' into the retort H, where the nitrous gases are absorbed. Freed from nitrogen oxides the gas escapes through the valve I and the pipe L. During the described operations the valves designated with capital letters are all open, while the valves marked with small letters are closed. When the content of the retort H is saturated with gas and the gas in C has been expelled all valves can be reversed whereby the function of the retorts is changed, furnace gas passing first to the retort H, heats it and expels concentrated nitrous gases therefrom, whereupon the gas flows to the retort C, where the nitrogen oxides are absorbed. The valve D may under certain circumstances be shut entirely off from the expulsion apparatus, in which case holes are arranged in the retort wall. The retort wall on a part of it may also be made so porous that a suitable percentage of gas penetrates through the same.

I claim:

1. Apparatus for producing concentrated nitrous gases and nitric acid from dilute nitrous gases, comprising an acid-proof vessel containing a dry absorbent, a gas-tight pressure-resisting jacket surrounding said vessel and spaced therefrom, means to supply gases around said vessel, means to admit a portion of the gases after traversing the length of the jacket to said vessel and separate means to allow the passage of gases from said jacket.

2. Apparatus for producing concentrated nitrous gases and nitric acid from dilute nitrous gases, comprising an acid-proof and fire-proof vessel for solid material, a gas-tight jacket capable of resisting nitrous gases under pressure and spaced from said vessel, means between the jacket and vessel to form a tortuous passage between the jacket and vessel, gas inlet and gas outlet means for the jacket and means to admit a portion of the gas from the bottom of the jacket to the bottom of said vessel.

3. Apparatus for the production of concentrated nitrous gases and nitric acid from dilute nitrous gases, which comprises a plurality of reacting absorbent vessels, a pressure-resisting jacket for each vessel and spaced therefrom, a valved connection between the jacket of each vessel and that of an adjacent one, means to supply nitrous gases under pressure to the jackets in succession, and a connection from the space between each jacket and the interior of its inclosing vessel.

4. Apparatus for the production of concentrated nitrous gases and nitric acid from dilute hot nitrous gases, which comprises a plurality of reacting absorbent containing vessels, a pressure-resisting jacket for each vessel spaced therefrom, a connection between the space between the jacket and vessel with the interior of the latter, means to supply nitrous gases under pressure to each jacket, a valved connection between the bottom of each jacket and the top of the adjoining jacket, whereby gases admitted to one jacket will be cooled by heating the vessel and the cooled gases be used in an adjacent vessel to expel the absorbed gases.

In testimony that I claim the foregoing as my invention, I have signed my name in presence of two subscribing witnesses.

BIRGER FJELD HALVORSEN.

Witnesses:
MARIE BERGQUIST,
FRIGOLF HARALDSEN.